United States Patent
Zheng et al.

(10) Patent No.: US 10,143,011 B2
(45) Date of Patent: Nov. 27, 2018

(54) CHANNEL ACCESS PROCESSING METHOD AND APPARATUS THEREOF

(71) Applicant: Huawei Technologies Co., Ltd., Shenzhen, Guangdong (CN)

(72) Inventors: Xiaoxiao Zheng, Shanghai (CN); Xudong Yang, Shanghai (CN); Li Feng, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 153 days.

(21) Appl. No.: 14/663,024

(22) Filed: Mar. 19, 2015

(65) Prior Publication Data

US 2015/0195856 A1    Jul. 9, 2015

Related U.S. Application Data

(63) Continuation of application No. PCT/CN2012/081577, filed on Sep. 19, 2012.

(51) Int. Cl.
| | |
|---|---|
| *H04W 74/08* | (2009.01) |
| *H04W 72/04* | (2009.01) |
| *H04W 74/00* | (2009.01) |
| *H04W 76/28* | (2018.01) |

(52) U.S. Cl.
CPC ... *H04W 74/0833* (2013.01); *H04W 72/0406* (2013.01); *H04W 74/0866* (2013.01); *H04W 74/006* (2013.01); *H04W 76/28* (2018.02)

(58) Field of Classification Search
None
See application file for complete search history.

(56) References Cited

U.S. PATENT DOCUMENTS

2003/0211846 A1* 11/2003 Nagpal ............. H04W 52/0229
                                                       455/434
2010/0034141 A1    2/2010 Meylan
(Continued)

FOREIGN PATENT DOCUMENTS

| CN | 102113400 A | 6/2011 |
|---|---|---|
| RU | 2 419 979 C2 | 5/2011 |

(Continued)

OTHER PUBLICATIONS

"Further Consideration on Fallback to R99", Huawei, 3GPP TSG-RAN WG2 #78, May 21-25, 2012, R2-122305.*
(Continued)

*Primary Examiner* — Chi H Pham
*Assistant Examiner* — Vladislav Y Agureyev
(74) *Attorney, Agent, or Firm* — Oblon, McClelland, Maier & Neustadt, L.L.P.

(57) ABSTRACT

The present invention provides a method for processing channel access and an apparatus thereof. The method includes: receiving a fallback to physical random access channel (PRACH) indication sent by a base station; and initiating access on a common enhanced dedicated channel (E-DCH). In the present invention, a fallback to PRACH indication is not executed, so as to prevent a user terminal from being in a DRX off state when a base station sends downlink data to the UE, thereby preventing the base station from delaying sending the downlink data to the UE.

15 Claims, 6 Drawing Sheets

(56) References Cited

U.S. PATENT DOCUMENTS

| | | | |
|---|---|---|---|
| 2010/0316159 A1* | 12/2010 | Bo | H04L 1/0035 375/295 |
| 2011/0081928 A1* | 4/2011 | Chen | H04W 72/048 455/507 |
| 2011/0199910 A1* | 8/2011 | Oh | H04W 52/0229 370/241 |
| 2011/0287774 A1* | 11/2011 | Li | H04W 76/048 455/452.1 |
| 2013/0039287 A1* | 2/2013 | Rayavarapu | H04W 76/048 370/329 |
| 2013/0039354 A1* | 2/2013 | Martin | H04W 72/04 370/338 |
| 2013/0122918 A1* | 5/2013 | Boley | H04W 76/046 455/450 |
| 2013/0170444 A1* | 7/2013 | Pani | H04W 72/0413 370/329 |
| 2013/0195027 A1* | 8/2013 | Hsu | H04W 74/006 370/329 |
| 2013/0208668 A1* | 8/2013 | Ramos | H04W 74/0833 370/329 |

FOREIGN PATENT DOCUMENTS

| | | | | |
|---|---|---|---|---|
| WO | WO 2011/020027 A1 | 2/2011 | | |
| WO | WO 2011124304 A1 * | 10/2011 | | H04W 36/00 |
| WO | WO 2012/051348 A1 | 4/2012 | | |
| WO | WO 2014/042573 A1 | 3/2014 | | |

OTHER PUBLICATIONS

"Enhanced UE DRX", Ericsson, 3GPP TSG-RAN WG2 #62, May 5-9, 2008, R2-082120.*

"Discussion on Fallback to R99 PRACH ", Ericsson, ST-Ericsson, 3GPP TSG-RAN WG2 meeting #79, Aug. 13-17, 2012; R2-123710.*

"Further Battery Saving for Small Data Transmission in Cell_FACH state", ZTE, China Unicom, 3GPP TSG-RAN WG2 meeting #79, Aug. 13-17, 2012; R2-124078.*

Draft Report of 3GPP TSG RAN WG2 meeting #79, Aug. 13-17, 2012, 206 pages, R2-124371.

"Open issues from email discussion on HS-DPCCH, Concurrent 2ms and 10ms TTI and common E-RGCH sub-features in FE-FACH", Qualcomm Incorporated, 3GPP TSG RAN WG2 #79, Aug. 13-17, 2012, 14 pages.

"Discussion on fallback to R99 PRACH", Ericsson, 3GPP TSG-RAN2 Meeting #79, Aug. 13-17, 2012, 3 pages.

"Discussion on UE in 2nd DRX upon reception of Fallback to R99 Indication", 3GPP TSG-RAN WG2 #79bis, Oct. 8-12, 2012, 3 pages.

"Enhanced UE DRX", Ericsson, 3GPP TSG-RAN WG2 #62, May 5-9, 2008, 3 pages.

"Further Consideration on Fallback to R99", Huawei, 3GPP TSG-RAN WG2 #78, May 21-25, 2012, 2 pages.

"Further Battery Saving for Small Data Transmission in Cell_FACH state", ZTE, China Unicom, 3GPP TSG-RAN WG2 meeting #79, Aug. 13-17, 2012, 4 pages.

"3rd Generation Partnership Project; Technical Specification Group Radio Access Network; Medium Access Control (MAC) protocol specification (Release 11)", 3GPP TS 25.321 V11.1.0, Jun. 2012, 198 pages.

"3rd Generation Partnership Project; Technical Specification Group Radio Access Network; Radio Resource Control (RRC); Protocol specification (Release 11)", 3GPP TS 25.331 V11.2.0, Jun. 2012, 1944 pages.

Russian Office Action dated Oct. 7, 2016 in Patent Application No. 2015114580/08(022746).

* cited by examiner

CHANNEL ACCESS PROCESSING METHOD AND APPARATUS THEREOF

CROSS-REFERENCE TO RELATED APPLICATIONS

This application is a continuation of International Application No. PCT/CN2012/081577, filed on Sep. 19, 2012, which is hereby incorporated by reference in its entirety.

TECHNICAL FIELD

The present invention relates to the field of wireless communications technologies, and in particular, to a method for processing channel access and an apparatus thereof.

BACKGROUND

In a universal mobile telecommunications system (UMTS), a user terminal (UE) that supports a common enhanced dedicated channel (E-DCH) needs to firstly compete for a common E-DCH resource before sending uplink data; after the common E-DCH resource is obtained by competing, if a timer that triggers the UE to enter a discontinuous reception (DRX) state runs, the timer is stopped; and if the UE is in the DRX state, the UE exits the DRX state and enters a continuous reception state. However, for a UE that supports physical random access channel (PRACH) access but does not support common E-DCH access, if a timer that triggers the UE to enter the DRX state runs, transmission of uplink data does not interrupt running of the timer, and if the UE is in the DRX state, transmission of uplink data does not interrupt the DRX state of the UE. The DRX state includes a state of receiving data in a discontinuous reception cycle, which is referred to as a DRX on state, and a state of not receiving data in a discontinuous reception cycle, which is referred tows DRX off state. When the UE is in the DRX on state, the UE receives downlink data; and when the UE is in the DRX off state, the UE does not receive downlink data; therefore, energy consumption can be reduced. To further reduce the energy consumption, enhanced DRX is introduced in the prior art, where the enhanced DRX refers to that there is a shorter DRX on state or a longer DRX off state in a discontinuous reception cycle. There are two specific implementation manners of the enhanced DRX: a one-layer DRX mechanism and a two-layer DRX mechanism, where the one-layer DRX mechanism refers to that after a timer that triggers a UE to enter a DRX state times out, the UE directly enters long DRX; and the two-layer DRX mechanism refers to two DRX cycles of two types, which are referred to as a short DRX cycle and a long DRX cycle in this specification, and after a timer that triggers a UE to enter the short DRX cycle times out, the UE enters the short DRX cycle, a timer that triggers the UE to enter the long DRX cycle is started at the same time, and after the timer that triggers the UE to enter the long DRX cycle times out, the UE enters the long DRX cycle. A long DRX cycle generally has a longer DRX off state, and more power is saved when a UE is in a long DRX cycle.

At present, to alleviate congestion on a common E-DCH, a fallback to PRACH (fallback to PRACH) feature is introduced to the prior art, that is, a UE that supports a common E-DCH falls back to PRACH access after receiving a "fallback to PRACH" indication sent by a base station. However, in a case in which the PRACH access is used, if the UE is in a long DRX state, the UE may delay sending downlink data, and even may enter an idle state.

SUMMARY

Embodiments of the present invention provide a method for processing channel access and an apparatus thereof, which are used to resolve a problem that sending downlink data to a user equipment (UE) is delayed.

A first aspect of an embodiment of the present invention provides a method for processing channel access, including: receiving a fallback to physical random access channel (PRACH) indication sent by a base station; and initiating access on a common enhanced dedicated channel (E-DCH).

In a first possible implementation manner, according to the first aspect, at or before the receiving a fallback to physical random access channel (PRACH) indication sent by a base station, the method further includes: determining that a current state is a discontinuous reception (DRX) state or a timer that triggers a UE to enter the DRX state is in a running state.

In a second possible implementation manner, according to the first aspect, at or before the receiving a fallback to physical random access channel (PRACH) indication sent by a base station, the method further includes:
determining that fallback to physical random access channel (PRACH) is supported and an enhanced discontinuous reception (DRX) capability is supported.

In a third possible implementation manner, with reference to the first aspect or the first possible implementation manner, the determining that a current state is a discontinuous reception (DRX) state includes: determining that the current state is a first DRX state of enhanced discontinuous reception (DRX) or a second DRX state of enhanced DRX.

A second aspect of an embodiment of the present invention provides a user terminal, including: a receiving module, configured to receive a fallback to physical random access channel (PRACH) indication sent by a base station; and an access module, configured to initiate access on a common enhanced dedicated channel common (E-DCH).

In a first possible implementation manner, according to the second aspect, the user terminal further includes: a determining module, configured to determine that a current state is a discontinuous reception (DRX) state or a timer that triggers the UE to enter the DRX state is in a running state.

In a second possible implementation manner, according to the second aspect, the determining module is further configured to determine that fallback to physical random access channel (PRACH) is supported and enhanced discontinuous reception (DRX) is supported.

In a third possible implementation manner, with reference to the second aspect or the first possible implementation manner, the determining module is specifically configured to determine that the current state is a first DRX state of enhanced discontinuous reception (DRX) or a second DRX state of enhanced DRX.

A third aspect of an embodiment of the present invention provides a user terminal, including:
  a receiver, configured to receive a fallback to physical random access channel (PRACH) indication sent by a base station; and
  a processor, configured to initiate access on a common enhanced dedicated channel (E-DCH).

In a first possible implementation manner, according to the third aspect, the processor is specifically configured to determine that a current state is a discontinuous reception (DRX) state or a DRX state triggering timer is in a running state.

In a second possible implementation manner, according to the third aspect, the processor is specifically configured to determine that fallback to physical random access channel (PRACH) is supported and enhanced discontinuous reception (DRX) is supported.

In a third possible implementation manner, with reference to the third aspect or the first possible implementation manner, the processor is specifically configured to determine that the current state is a first DRX state of enhanced discontinuous reception (DRX) or a second DRX state of enhanced DRX.

In the embodiments of the present invention, a fallback to PRACH indication is not executed, so as to prevent a user terminal from being in a DRX off state when a base station sends downlink data to the user equipment (UE), thereby preventing the base station from delaying sending of the downlink data to the UE.

A fourth aspect of an embodiment of the present invention provides a method for processing channel access, including: receiving a fallback to physical random access channel (PRACH) indication sent by a base station;
 determining that non-enhanced discontinuous reception (DRX) or first DRX of enhanced DRX is used; and
 initiating access on a PRACH.

A fifth aspect of an embodiment of the present invention provides a user terminal, including: a receiving module, configured to receive a fallback to physical random access channel (PRACH) indication sent by a base station;
 a determining module, configured to determine that non-enhanced discontinuous reception (DRX) or first DRX of enhanced DRX is used; and
 an access module, configured to initiate access on a PRACH.

A sixth aspect of an embodiment of the present invention provides a user terminal, including: a processor and a receiver, where
 the receiver is configured to receive a fallback to physical random access channel (PRACH) indication sent by a base station; and
 the processor is configured to determine that non-enhanced discontinuous reception (DRX) or first DRX of enhanced DRX is used, and initiate access on a PRACH.

In the embodiments of the present invention, a user terminal is made to use a DRX mechanism with DRX off state duration being relatively short, which relatively shortens a delay in sending, by a base station, downlink data to the UE when the user terminal is in a DRX off state.

A seventh aspect of an embodiment of the present invention provides a method for processing channel access, including: receiving a fallback to physical random access channel (PRACH) indication sent by a base station;
 initiating access on PRACH, and entering a continuous reception state; and
 if a timer that triggers entering a discontinuous reception (DRX) state is running, stopping the timer.

In a first possible implementation manner, according to the seventh aspect, the entering a continuous reception state includes: entering the continuous reception state when the indication is received; or entering the continuous reception state when preamble information is sent to the base station on the physical random access channel (PRACH); or entering the continuous reception state when a positive acknowledgement frame or a negative acknowledgement frame that is fed back by the base station according to the preamble information is received on an acquisition indicator channel (AICH); or entering the continuous reception state after a common control channel (CCCH) message or a dedicated control channel (DCCH) message is sent to a radio network controller (RNC) on the PRACH.

An eighth aspect of an embodiment of the present invention provides an access processing method, including: receiving a common control channel (CCCH) message or a dedicated control channel (DCCH) message that is sent on a PRACH by a user equipment (UE) that supports a fallback to PRACH function; and sending, to a base station, a frame or signaling that carries an indication that the UE currently is in a continuous reception state.

In a first possible implementation manner, according to the eighth aspect, the sending, to a base station, indication information that the UE currently is in a continuous reception state or a continuous scheduling state includes: inserting the indication in a frame protocol (FP) frame, signaling, a response frame of the CCCH message or of the DCCH message, or the first downlink frame after the CCCH message or the DCCH message is received.

A ninth aspect of an embodiment of the present invention provides an access processing method, including: receiving a frame or signaling that is sent by a radio network controller (RNC) and carries an indication that a user equipment (UE) currently is in a continuous reception state or a continuous scheduling state, where the frame or the signaling is used to enable a base station to continuously schedule downlink data.

A tenth aspect of an embodiment of the present invention provides a user terminal, including: a receiving module, configured to receive a fallback to physical random access channel (PRACH) indication sent by a base station; an access module, configured to initiate access on PRACH; and an updating module, configured to enter a continuous reception state; and if a timer that triggers entering a discontinuous reception (DRX) state is running, stop the timer.

In a first possible implementation manner, according to the tenth aspect, the updating module is specifically configured to enter the continuous reception state when the indication is received; or enter the continuous reception state when preamble information is sent to the base station on the physical random access channel (PRACH); or enter the continuous reception state when a positive acknowledgement frame or a negative acknowledgement frame that is fed back by the base station according to the preamble information is received on an acquisition indicator channel (AICH); or enter the continuous reception state after a common control channel (CCCH) message or a dedicated control channel (DCCH) message is sent to an RNC on the PRACH.

An eleventh aspect of an embodiment of the present invention provides a radio network controller, including: a receiving module, configured to receive a common control channel (CCCH) message or a dedicated control channel (DCCH) message that is sent on a PRACH by a user equipment (UE) that supports a fallback to PRACH function; and a sending module, configured to send, to abase station, a frame or signaling that carries an indication that the UE currently is in a continuous reception state or a continuous scheduling state, so that the base station sends downlink data to the UE.

In a first possible implementation manner, according to the eleventh aspect, the sending module is specifically configured to insert the indication in a frame protocol (FP) frame, signaling, a response frame of the CCCH message or of the DCCH message, or the first downlink frame after the CCCH message or the DCCH message is received.

A twelfth aspect of an embodiment of the present invention provides a base station, including: a receiving module, configured to receive a frame or signaling that is sent by a radio network controller (RNC) and carries an indication that a user equipment (UE) currently is in a continuous reception state, where the frame or the signaling is used to enable the base station to continuously schedule downlink data.

A thirteenth aspect of an embodiment of the present invention provides a channel access processing system, including: the foregoing radio network controller and the foregoing base station.

A fourteenth aspect of an embodiment of the present invention provides a user terminal, including:
 a receiver, configured to receive a fallback to physical random access channel (PRACH) indication sent by a base station; and
 a processor, configured to initiate access on PRACH and enter a continuous reception state; and if a timer that triggers entering a discontinuous reception (DRX) state is running, stop the timer.

In a first possible implementation manner, according to a fourteenth aspect, the processor is specifically configured to enter the continuous reception state when the indication is received; or
 enter the continuous reception state when preamble information is sent to the base station on the physical random access channel (PRACH); or
 enter the continuous reception state when a positive acknowledgement frame or a negative acknowledgement frame that is fed back by the base station according to the preamble information is received on an acquisition indicator channel (AICH); or
 enter the continuous reception state after a common control channel (CCCH) message or a dedicated control channel (DCCH) message is sent to an RNC on the PRACH.

A fifteenth aspect of an embodiment of the present invention provides a radio network controller, including:
 a receiver, configured to receive a common control channel (CCCH) message or a dedicated control channel (DCCH) message that is sent on a PRACH by a user equipment (UE) that supports a fallback to PRACH function; and
 a transmitter, configured to send, to a base station, a frame or signaling that carries an indication that the UE currently is in a continuous reception state or a continuous scheduling state.

In a first possible implementation manner, according to the fifteenth aspect, the transmitter is specifically configured to insert the indication in a frame protocol (FP) frame, signaling, a response frame of the CCCH message or of the DCCH message, or the first downlink frame after the CCCH message or the DCCH message is received.

A sixteenth aspect of an embodiment of the present invention provides a base station, including:
 a receiver, configured to receive a frame or signaling that is sent by a radio network controller (RNC) and carries an indication that a user equipment (UE) currently is in a continuous reception state, where the frame or the signaling is used to enable the base station to continuously schedule downlink data.

In the embodiments of the present invention, a UE exits a DRX state, and an RNC notifies a base station that the UE currently is in a continuous reception state, so that the base station can immediately send downlink data to the UE, which avoids a case in which the base station delays sending downlink data when the UE is in a DRX off state.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

Figure 1:
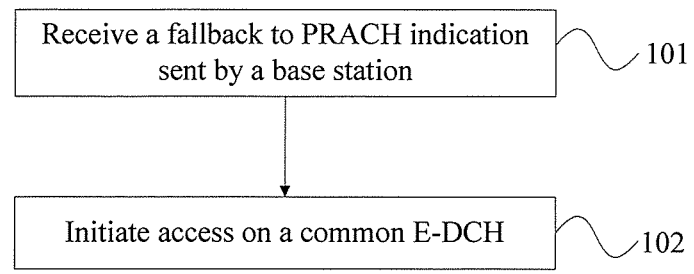
FIG. 1 is a schematic flowchart of Embodiment 1 of a method for processing channel access according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and a next-generation communications system, for example, a global system for mobile communications (GSM) system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single-carrier FDMA (SC-FDMA) system, a general packet radio service (GPRS) system, a long term evolution (LTE) system, and other communications systems.

Various aspects are described in this specification with reference to a user equipment and/or a base station and/or a base station controller.

The user equipment may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, user device, or a user equipment.

The base station (for example, an access point) may refer to a device in communication with a wireless terminal via one or more sectors at an air interface in an access network. The base station may be configured to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS) in GSM or the CDMA, may also be a base station (NodeB) in WCDMA, and may further be an evolved NodeB (eNB, or e-NodeB, evolved Node B) in the LTE, which is not limited in the application.

The base station controller may be a base station controller (BSC) in GSM or CDMA, or a radio network controller (RNC) in WCDMA, which is not limited in the application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

FIG. 1 is a schematic flowchart of Embodiment 1 of a method for processing channel access according to the present invention, and as shown in FIG. 1, the method includes:

101: Receive a fallback to PRACH indication sent by a base station, where the indication may be represented as fallback to PRACH.

The fallback to PRACH indication may be a negative acknowledgement frame or a special common E-DCH resource indication, which is received on an acquisition indicator channel (RICH). It should be noted that the negative acknowledgement frame is used to indicate that a common E-DCH resource is not obtained by competing, and the special common E-DCH resource indication specifically refers to that it can be determined, according to a resource number of the common E-DCH resource, that a UE falls back to a PRACH; and in addition, the fallback to PRACH indication may be received by a user terminal, where the user terminal may currently initiate access on a common E-DCH, but it is not limited thereto.

102. Initiate access on a common E-DCH.

The user terminal, after receiving the "fallback to PRACH" indication, ignores the indication, that is, the user terminal performs processing as if the indication is not received or considers the indication as a negative acknowledgement frame to execute fallback, that is, as long as a Medium Access Control (MAC) layer random access cycle period does not reach a maximum value or a positive acknowledgement frame is detected on the AICH channel, the user terminal continues to initiate the access on the common E-DCH.

After the common E-DCH is accessed, that is, the positive acknowledgement frame is received on the AICH, if the user terminal is in a DRX state, the user terminal exits the DRX state and enters a continuous reception state; and if a timer that triggers the user terminal to enter the DRX state is running, the user terminal stops the timer and enters the continuous reception state. It should be noted that if the user terminal enters the DRX state, the user terminal must undergo a DRX off state, that is, downlink data is not received in this period of time, and as a result the base station may delay sending the downlink data.

It should be noted that, further, after the UE exits the DRX state, if the downlink data is received, the UE starts the timer that triggers the UE to enter the DRX state, and the UE enters the DRX state after the timer times out. Specifically, if one-layer DRX is configured (that is, only a long DRX state is configured), a long-DRX state triggering timer is restarted after the downlink data is received, and the UE enters the long DRX state after the timer times out; if two-layer DRX is configured (that is, the short DRX state and the long DRX state are both configured), a short-DRX state triggering timer is restarted after the downlink data is received, the UE enters the short DRX state after the timer times out, and the long-DRX state triggering timer is simultaneously started, and after the timer times out, the UE enters the long DRX state.

In this embodiment, a fallback to PRACH indication is not executed, so that a UE continues to initiate access on a common E-DCH, and after obtaining a common E-DCH resource by competing, the UE exits a DRX state and enters a continuous reception state, which avoids a case: the UE is in a DRX off state when a base station sends downlink data to the UE, and therefore the base station delays sending the downlink data to the UE.

In a specific implementation process, when or before the fallback to physical random access channel (PRACH) indication sent by the base station is received, it is determined that a UE supports fallback to physical random access channel (PRACH) and supports enhanced discontinuous reception (DRX); and the UE implements a function in this embodiment on this basis.

More specifically, the step 101 may further optionally include: when or before the fallback to physical random access channel (PRACH) indication sent by the base station is received, it needs to be determined that a current state is a discontinuous reception (DRX) state or a DRX state triggering timer is in a running state. If the user terminal currently is in the discontinuous reception state, or the timer that triggers the user terminal to enter the DRX state currently is running, the fallback to PRACH indication is ignored, that is, the user terminal performs processing as if the indication is not received or considers the indication as the negative acknowledgement frame to execute the backoff, that is, as long as the MAC layer random access cycle period does not reach the maximum value or no positive acknowledgement frame is received on the AICH, the user terminal continues to initiate the access on the common E-DCH, and otherwise, the user terminal may execute the fallback to PRACH indication; and in this case, the base station does not delay or shorten a delay in sending the downlink data to the user terminal.

In addition, the determining that a current state is a DRX state includes: determining that the current state is a first DRX state of enhanced DRX, that is, a short DRX state, or a second DRX state of enhanced DRX, that is, a long DRX state; where duration of a DRX off state of the first DRX state is generally far shorter than duration of a DRX off state of the second DRX state; or duration of a DRX on state of the first DRX state is longer than duration of a DRX on state of the second DRX state; and certainly in this case, the user terminal may also be in a non-enhanced DRX state, and duration of a DRX off state of the non-enhanced DRX state is shorter.

In this embodiment, it may be that the user terminal, when in the second DRX state, ignores the fallback to PRACH indication, that is, the user terminal performs processing as if the indication is not received or considers the indication as the negative acknowledgement frame to execute the backoff, that is, as long as the MAC layer random access cycle period does not reach the maximum value or the positive acknowledgement frame is not obtained by listening on the AICH, the user terminal continues to initiate the access on the common E-DCH, and otherwise, the user terminal may execute a fallback to PRACH operation, that is, the user terminal executes the fallback to PRACH operation in the continuous reception state or the first DRX state; or the user terminal may ignore the fallback to PRACH indication when the user terminal is in the second DRX state or the first DRX state, that is, the user terminal performs processing as if the indication is not received or considers the indication as the negative acknowledgement frame to execute the backoff, that is, as long as the MAC layer random access cycle period does not reach the maximum value, the user terminal continues to initiate the access on the common E-DCH, and otherwise, the user terminal may execute the fallback to PRACH indication.

In this embodiment, a fallback to PRACH indication is not executed, and a common E-DCH is accessed, so that the UE may exit a DRX state and enter a continuous reception state, which avoids a case: the UE is in a DRX off state when a base station sends downlink data to the UE, and therefore the base station delays sending the downlink data to the UE.

Figure 2:
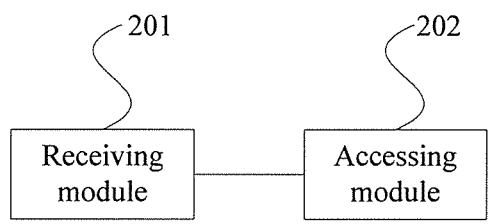
FIG. 2 is a schematic structural diagram of Embodiment 1 of a user terminal according to the present invention.

FIG. 2 is a schematic structural diagram of Embodiment 1 of a user terminal according to the present invention, and as shown in FIG. 2, the user terminal includes: a receiving module 201 and an access module 202.

The receiving module 201 is configured to receive a fallback to physical random access channel (PRACH) indication sent by a base station.

The access module 202 is configured to initiate access on a common enhanced dedicated channel common (E-DCH).

Figure 3:
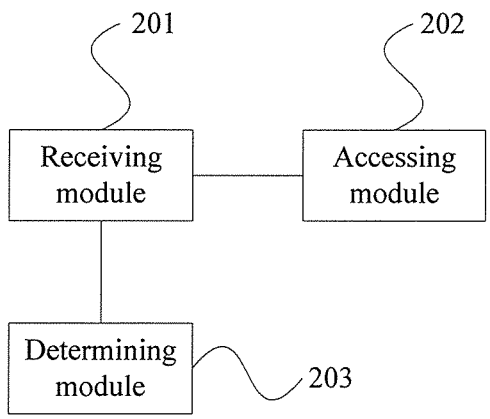
FIG. 3 is a schematic structural diagram of Embodiment 2 of a user terminal according to the present invention.

FIG. 3 is a schematic structural diagram of Embodiment 2 of a user terminal according to the present invention. Based on FIG. 2, the user terminal further includes a determining module 203, where the determining module 203 is configured to determine that a current state is a discontinuous reception (DRX) state or a DRX state triggering timer is in a running state, and is specifically configured to determine that the current state is a first DRX state of enhanced DRX or a second DRX state of enhanced DRX.

The determining module 203 is further configured to determine that the user terminal supports fallback to physical random access channel (PRACH) and supports enhanced discontinuous reception (DRX).

Specific working principles of all the foregoing modules in FIG. 2 and FIG. 3 are the same as those in the foregoing method embodiment, and no details are described herein again.

Figure 4:
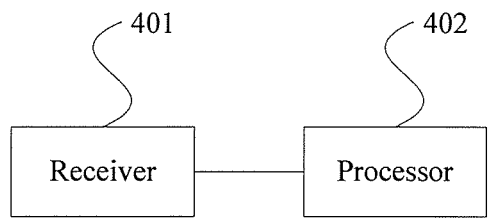
FIG. 4 is a schematic structural diagram of Embodiment 1 of a user terminal according to the present invention.

FIG. 4 is a schematic structural diagram of Embodiment 1 of a user terminal according to the present invention, and as shown in FIG. 4, the user terminal includes: a receiver 401 and a processor 402.

The receiver 401 is configured to receive a fallback to physical random access channel (PRACH) indication sent by a base station.

The processor 402 is configured to initiate access on a common enhanced dedicated channel common (E-DCH).

In a specific implementation process, the processor 402 is specifically configured to determine that a current state is a discontinuous reception (DRX) state or a DRX state triggering timer is in a running state; where the processor 402 is specifically configured to determine that the current state is a first DRX state of enhanced discontinuous reception (DRX) or a second DRX state of enhanced DRX.

The processor 402 is further specifically configured to determine that fallback to physical random access channel (PRACH) is supported and enhanced discontinuous reception (DRX) is supported.

Specific working principles of the receiver and the processor here are corresponding to those in the foregoing method embodiment, and no details are described herein again.

In this embodiment, although the receiver 401 receives a fallback to PRACH indication, the processor 402 is enabled to initiate access on a common E-DCH, which may avoid a case: a UE is in a DRX off state when a base station sends downlink data to the UE, and therefore the base station delays sending the downlink data to the UE.

Figure 5:
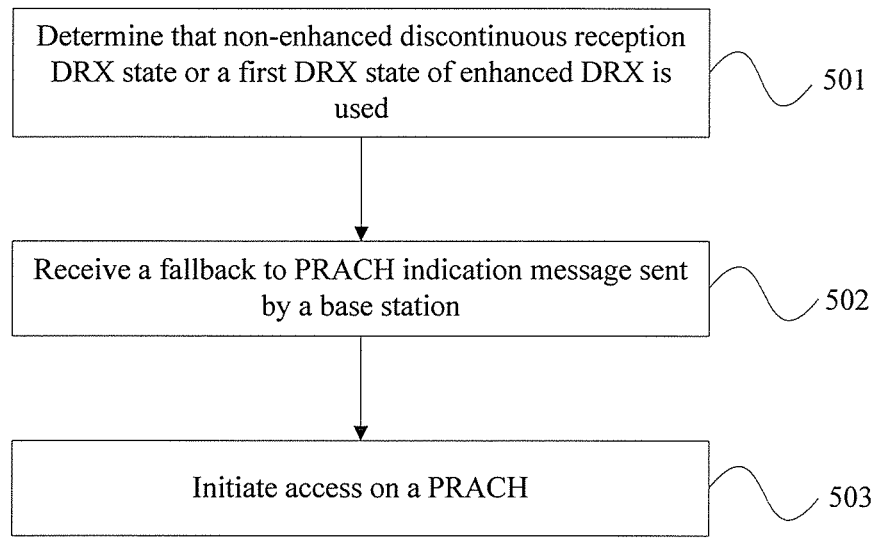
FIG. 5 is a schematic flowchart of Embodiment 1 of another method for processing channel access according to the present invention.

FIG. 5 is a schematic flowchart of Embodiment 1 of another method for processing channel access according to the present invention, and as shown in FIG. 5, the method is described as follows:

501: Determine that non-enhanced discontinuous reception (DRX) or a first DRX state of enhanced DRX is used.

If a UE, which supports fallback to PRACH and enhanced DRX, receives a "fallback to PRACH" configuration sent by an RNC, the UE can use only a non-enhanced DRX mechanism, or can use only the first DRX state of enhanced DRX, that is, a short DRX state. The "fallback to PRACH" configuration mentioned here includes two indications: CCCH fallback and DCCH fallback, that is, if the CCCH fallback indication is TRUE, it indicates that a fallback to PRACH process may be executed when the UE sends a CCCH message, and similarly, DCCH fallback refers to that the fallback to PRACH process may be executed when a DCCH message is sent.

502: Receive a fallback to PRACH indication sent by a base station.

503: Initiate access on a PRACH, that is, execute the fallback to PRACH indication received in 502.

It should be noted that the user terminal that supports the fallback to PRACH and the enhanced DRX, after receiving the fallback to PRACH indication, uses a short DRX mechanism. For example, even though the enhanced DRX is configured for a network, the UE can use only the short DRX mechanism, or if the UE is in a long DRX state, after receiving the fallback to PRACH indication, the UE falls back to the short DRX mechanism, where a short-DRX parameter includes a short-DRX cycle length and a short-DRX burst length, so as to calculate specific time points of being in a DRX on state and a DRX off state. The short DRX mechanism mentioned here includes the non-enhanced DRX, that is, Release 8 DRX or the short DRX of enhanced DRX, where the enhanced DRX refers to enhanced DRX introduced in Release 11, and the enhanced DRX may include the short DRX state and the long DRX mechanism.

It should be noted that, correspondingly the base station obtains, from the RNC, both information that the UE has a capability of supporting fallback to PRACH and configuration information of fallback to PRACH, that is, for the UE with this capability the base station can use only the non-enhanced DRX mechanism, or can use only the first DRX state of enhanced DRX, that is, the short DRX state.

In this embodiment, only a DRX mechanism with shorter DRX off state duration is used, so that a delay in sending, by a base station, downlink data to a user terminal is shortened when the user terminal is in a DRX off state.

Figure 6:
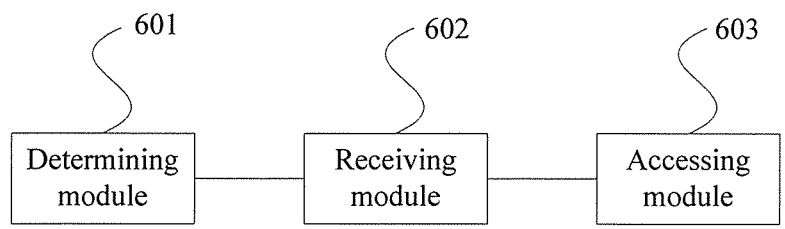
FIG. 6 is a schematic structural diagram of Embodiment 1 of another user terminal according to the present invention.

FIG. 6 is a schematic structural diagram of Embodiment 1 of another user terminal according to the present invention, and as shown in FIG. 6, the user terminal includes: a determining module 601, a receiving module 602, and an access module 603.

The determining module 601 is configured to determine that non-enhanced discontinuous reception (DRX) or first DRX of enhanced DRX is used.

The receiving module 602 is configured to receive a fallback to PRACH indication sent by a base station.

The access module 603 is configured to initiate access on a PRACH.

Workings of all the foregoing modules are the same as those in the method embodiment in FIG. 5, and no details are described herein again.

Figure 7:
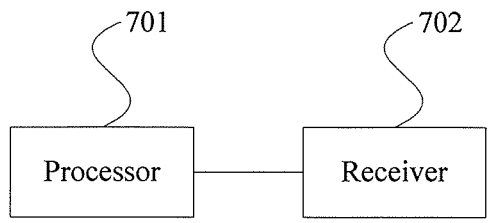
FIG. 7 is a schematic structural diagram of Embodiment 1 of another user terminal according to the present invention.

FIG. 7 is a schematic structural diagram of Embodiment 1 of another user terminal according to the present invention, and as shown in FIG. 7, the user terminal includes: a processor 701 and a receiver 702.

The processor 701 is configured to determine that non-enhanced discontinuous reception (DRX) or first DRX of enhanced DRX is used.

The receiver 702 is configured to receive a fallback to physical random access channel (PRACH) indication sent by a base station.

The processor 701 is further configured to initiate access on a PRACH.

Workings of the foregoing processor and receiver are the same as those in the method embodiment in FIG. 5, and no details are described herein again.

In this embodiment, a user terminal can use only a DRX mechanism with shorter DRX off state duration, and therefore, a delay in sending, by a base station, downlink data to the user terminal may be shortened when the user terminal is in a DRX off state.

Figure 8:
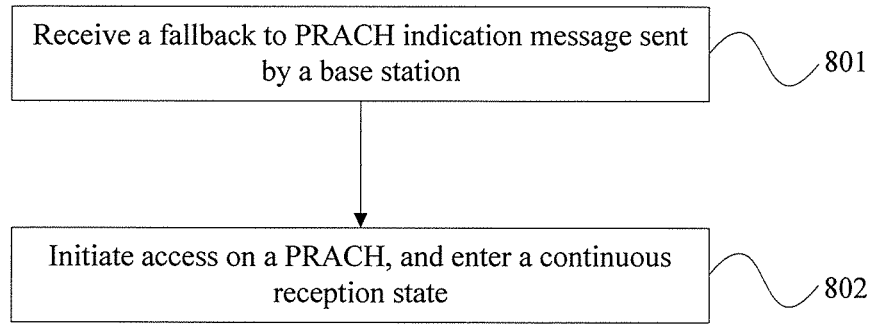
FIG. 8 is a schematic flowchart of Embodiment 1 of another method for processing channel access according to the present invention.

FIG. 8 is a schematic flowchart of Embodiment 1 of another method for processing channel access according to the present invention, and as shown in FIG. 8, the method is described as follows:

801: Receive a fallback to PRACH indication sent by a base station.

The indication is received by a user terminal, and the user terminal supports a common E-DCH function and/or supports fallback to PRACH.

802. Initiate access on a PRACH, and enter a continuous reception state; and if a timer that triggers entering a DRX state is running, stop the timer.

More specifically, the entering a continuous reception state includes two cases:

1. If the timer that is used to trigger the UE to enter the DRX state is running, stop the timer, and enter the continuous reception state.

2. If a current state is a discontinuous reception (DRX) state, exit the DRX state and enter the continuous reception state.

It should be noted that although the user terminal executes the received indication and initiates the access on the PRACH, the user terminal may undergo a DRX off state, and therefore the user terminal stops the timer that triggers the UE to enter the DRX state or exits the DRX state, so as to avoid that: the user terminal is in a DRX off state when the base station sends downlink data to the user terminal.

In addition, the user terminal may enter the continuous reception state when the fallback to PRACH indication is received; or enter the continuous reception state when preamble information is sent to the base station on the PRACH; or enter the continuous reception state when a positive acknowledgement frame or a negative acknowledgement frame that is fed back by the base station according to the preamble information is received on an acquisition indicator channel (AICH); or enter the continuous reception state after a common control channel (CCCH) message or a dedicated control channel (DCCH) message is sent to an RNC on the PRACH.

According to this embodiment, a user terminal exits a DRX state, which avoids that the user terminal is in a DRX off state when a base station sends downlink data to the user terminal, and therefore avoids that the base station delays sending the downlink data to the user terminal.

Figure 9:
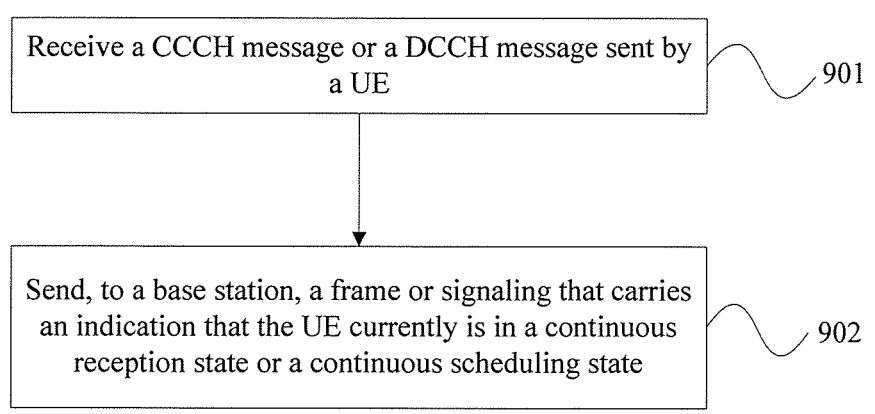
FIG. 9 is a schematic flowchart of Embodiment 1 of another method for processing channel access according to the present invention.

FIG. 9 is a schematic flowchart of Embodiment 1 of another method for processing channel access according to the present invention, and as shown in FIG. 9, the method is described as follows:

901: Receive a CCCH message or a DCCH message that is sent on a PRACH by a UE that supports a fallback to PRACH function.

The UE sends the CCCH message or the DCCH message on the PRACH; after receiving the message, that is, after a random access data frame (RACH Data Frame) is received, an RNC considers that the UE is currently in a continuous reception state or a continuous scheduling state, where specifically, the continuous scheduling state refers to that downlink data may be directly scheduled.

902: Send, to a base station, a frame or signaling that carries an indication that the UE currently is in a continuous reception state or a continuous scheduling state, so that the base station sends downlink data to the UE, that is, there is no need to calculate a time when the UE is in a DRX on state.

After the RNC determines that the UE is in the continuous reception state, the RNC sends the downlink data to the UE, and at the same time notifies the base station, that is, notifies the base station that the corresponding UE is in the continuous reception state, and in this way, the base station may immediately send the downlink data to the UE.

It should be noted that the RNC here inserts the indication in a Frame Protocol (FP) frame, signaling, a response frame of the CCCH message or of the DCCH message, or the first downlink frame after the CCCH message or the DCCH message is received.

In addition, there may be specifically two implementation methods: the first method is: after receiving the CCCH message or the DCCH message, when a corresponding response message is sent to the UE or a first message is sent to the UE, inserting the indication indicating that the UE is in the continuous reception state in the corresponding FP frame or the signaling; and the second method is: after the CCCH message or the DCCH message is received, carrying, by the FP frame or the signaling, the indication indicating that the UE is in the continuous reception state, where the FP frame or the signaling does not carry the downlink data.

A specific example for description of the foregoing first implementation method is as follows: after the RNC receives, on the PRACH, the DCCH message of a UE that supports a common E-DCH or fallback to PRACH, the indication that the UE currently is in the continuous reception state is carried in an FP frame of a corresponding radio link control acknowledgement frame (RLC ACK) fed back to the UE, and an FP frame, of other downlink data, that is subsequently sent to the use equipment does not carry the indication.

Alternatively, after the RNC receives, on the PRACH, the CCCH message (such as a cell update message CELL UPDATE, where the CELL UPDATE is carried on a CCCH channel) of the UE that supports the common E-DCH or fallback to PRACH, the indication that the UE currently is in the continuous reception state is carried in an FP frame of a corresponding response message, such as a CELL UPDATE CONFIRM, that is fed back to the UE, and an FP frame, of other downlink data, that is subsequently sent to a terminal does not carry the indication.

In this embodiment, an RNC notifies a base station that a UE is in a continuous reception state, so that the base station immediately sends downlink data to the UE, which avoids a case: the base station determines that the UE is in a DRX off state, and therefore delays sending the downlink data to the user terminal.

Figure 10:
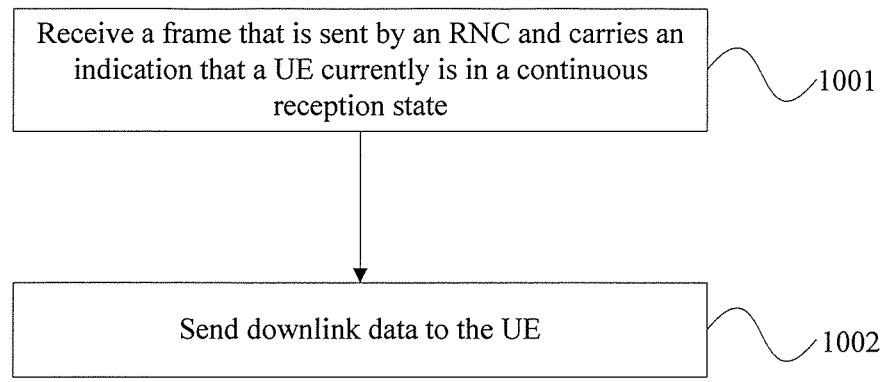
FIG. 10 is a schematic flowchart of Embodiment 1 of another method for processing channel access according to the present invention.

FIG. 10 is a schematic flowchart of Embodiment 1 of another method for processing channel access according to the present invention, and as shown in FIG. 10, the method is described as follows:

1001: Receive a frame or signaling that is sent by an RNC and carries an indication that a UE currently is in a continuous reception state or a continuous scheduling state, so that a base station continuously schedules downlink data.

After receiving the indication, the base station learns that the UE is in the continuous reception state, and therefore may directly send the downlink data to the UE, that is, being in a DRX on state does not need to be considered.

1002: Send the downlink data to the UE, which specifically refers to that if there is downlink data that needs to be sent, scheduling is performed immediately.

In this embodiment, after learning from received indication information that a UE is in a continuous reception state, the base station immediately schedules downlink data, which avoids a case: the UE is determined to be in a DRX off state, and therefore sending the downlink data to the UE is delayed.

Figure 11:
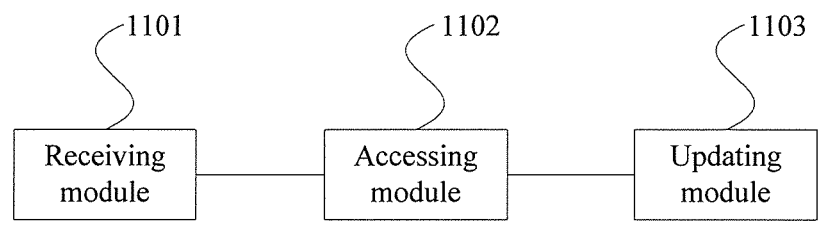
FIG. 11 is a schematic structural diagram of Embodiment 1 of another user terminal according to the present invention.

FIG. 11 is a schematic structural diagram of Embodiment 1 of another user terminal according to the present invention, and as shown in FIG. 11, the user terminal includes: a receiving module 1101, an access module 1102, and an updating module 1103.

The receiving module 1101 is configured to receive a fallback to physical random access channel (PRACH) indication sent by a base station.

The access module 1102 is configured to initiate access on PRACH.

The updating module 1103 is configured to enter a continuous reception state; or if a timer that triggers entering a discontinuous reception (DRX) state is running, stop the timer.

Specifically, the updating module 1103 is configured to: if the timer that triggers the UE to enter the DRX state is started, stop the timer and enter the continuous reception state; and if a current state is the discontinuous reception (DRX) state, exit the DRX state and enter the continuous reception state.

It should be noted that the updating module 1103 may enter the continuous reception state when the indication is received; or enter the continuous reception state when preamble information is sent to the base station on the PRACH; or enter the continuous reception state when a positive acknowledgement frame or a negative acknowledgement frame that is fed back by the base station according to the foregoing preamble information is received on an RICH; or enter the continuous reception state after a CCCH message or a DCCH message is sent to an RNC on the PRACH.

Workings of all the foregoing modules are the same as those in the method embodiment in FIG. 8, and no details are described herein again.

In this embodiment, a user terminal exits a DRX state, and may continuously receive downlink data sent by a base station, so that it is avoided that: the base station needs to delay sending the downlink data to the UE when the UE is a DRX off state.

Figure 12:
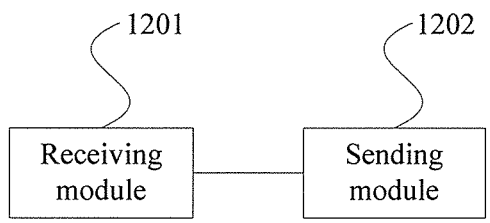
FIG. 12 is a schematic structural diagram of Embodiment 1 of a radio network controller according to the present invention.

FIG. 12 is a schematic structural diagram of Embodiment 1 of a radio network controller according to the present invention, and as shown in FIG. 12, the radio network controller includes: a receiving module 1201 and a sending module 1202.

The receiving module 1201 is configured to receive a CCCH message or a DCCH message that is sent on a PRACH by a UE that supports a fallback to PRACH function.

The sending module 1202 is configured to send, to a base station, a frame or signaling that carries an indication that the UE currently is in a continuous reception state or a continuous scheduling state, so that the base station sends downlink data to the UE.

Specifically, the sending module 1202 inserts the indication in an FP frame, signaling, a response frame of the CCCH message or of the DCCH message, or the first downlink frame after the CCCH message or the DCCH message is received.

Workings of all the foregoing modules are the same as those in the method embodiment in FIG. 9, and no details are described herein again.

In this embodiment, after a receiving module of an RNC receives a message sent by a UE, the receiving module may notify the base station that the UE currently is in a continuous reception state, and therefore the base station may immediately schedule downlink data without needing to consider a delayed sending problem.

The base station provided by the present invention includes: a receiving module.

The receiving module is configured to receive the frame or the signaling that is sent by the RNC and carries the indication that the UE currently is in the continuous reception state, where the frame or the signaling is used to enable the base station to continuously schedule the downlink data.

Workings of all the foregoing modules are the same as those in the method embodiment in FIG. 10, and no details are described herein again.

In this embodiment, after receiving indication information of an RNC, a base station may immediately send downlink data to a UE without needing to consider a delayed sending problem.

Figure 13:
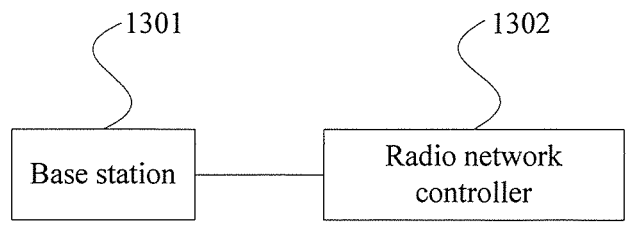
FIG. 13 is a schematic structural diagram of Embodiment 1 of a channel access processing system according to the present invention.

FIG. 13 is a schematic structural diagram of Embodiment 1 of a channel access processing system according to the present invention, and as shown in FIG. 13, the system includes: a base station 1301 and a radio network controller 1302, where the radio network controller is the radio network controller shown in FIG. 12, and no details are described herein again.

Figure 14:
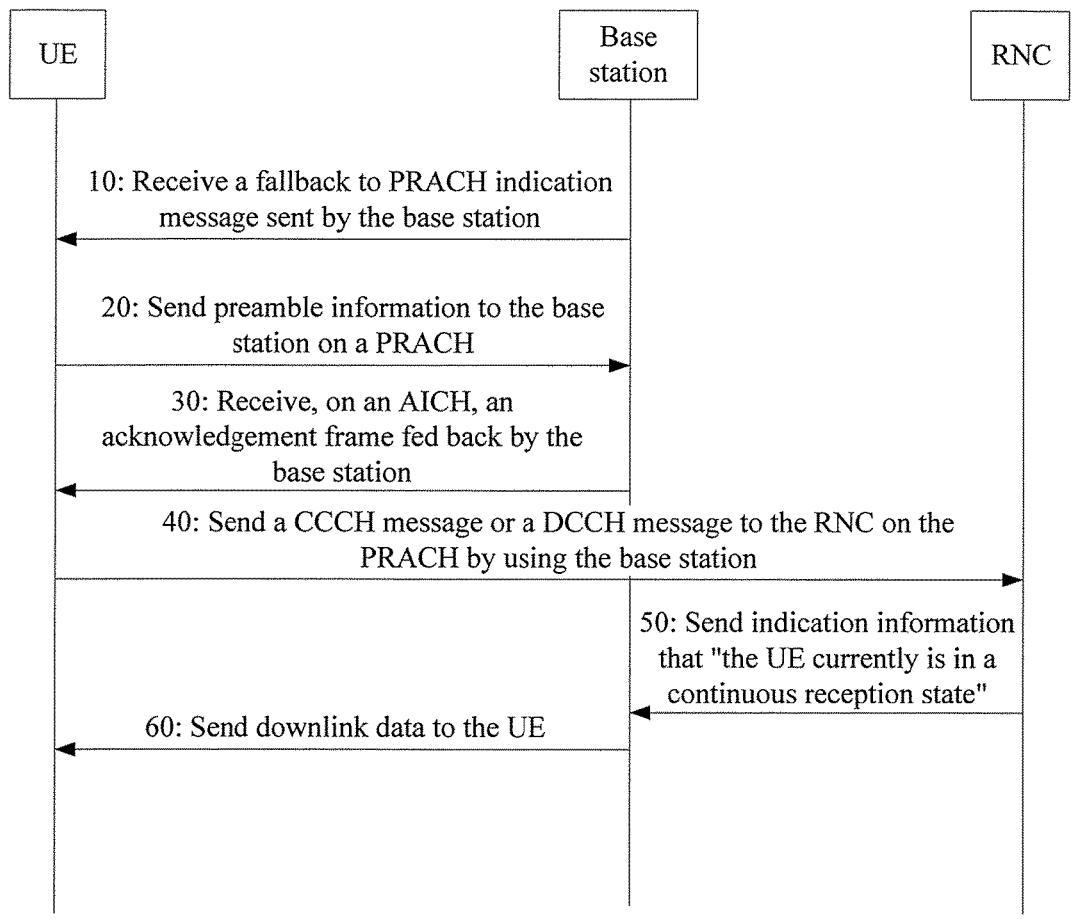
FIG. 14 is a schematic flowchart of Embodiment 2 of a method for processing channel access according to the present invention.

FIG. 14 is a schematic flowchart of Embodiment 2 of a method for processing channel access according to the present invention, and as shown in FIG. 14, the method is described as follows:

10: A UE receives a fallback to PRACH indication sent by a base station.

20: The UE sends preamble information to the base station on a PRACH.

30: The UE receives, on an AICH, an acknowledgement frame that is fed back by the base station; and after receiving the preamble information, the base station sends the acknowledgement frame to the UE to notify the UE that the preamble information has been received.

40: The UE sends a CCCH message or a DCCH message to an RNC on the PRACH by using the base station.

50: The RNC sends indication information that "the UE is in a continuous reception state" to the base station; and after receiving the CCCH message or DCCH message, the RNC determines that the UE is in the continuous reception state, and sends the indication to the base station.

60: The base station sends downlink data to the UE.

Figure 15:
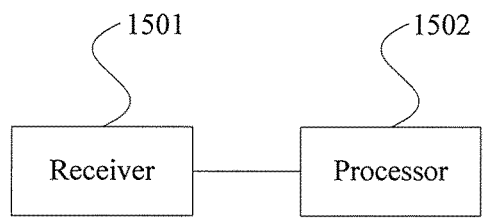
FIG. 15 is a schematic structural diagram of Embodiment 1 of another user terminal according to the present invention.

FIG. 15 is a schematic structural diagram of Embodiment 1 of another user terminal according to the present invention, and as shown in FIG. 15, the user terminal includes: a receiver 1501 and a processor 1502.

The receiver 1501 is configured to receive a fallback to PRACH indication sent by a base station.

The processor 1502 is configured to initiate access on PRACH and enter a continuous reception state; and if a timer that triggers entering a discontinuous reception (DRX) state is running, stop the timer.

In a specific implementation process, the processor 1502 is specifically configured to enter the continuous reception state when the indication is received; or enter the continuous reception state when preamble information is sent to the base station on the physical random access channel (PRACH); or enter the continuous reception state when a positive acknowledgement frame or a negative acknowledgement frame that is fed back by the base station according to the preamble information is received on an acquisition indicator channel (AICH); or enter the continuous reception state after a common control channel (CCCH) message or a dedicated control channel (DCCH) message is sent to an RNC on the PRACH.

Workings of the receiver and the processor are the same as those in the method embodiment in FIG. 8, and no details are described herein again.

Figure 16:
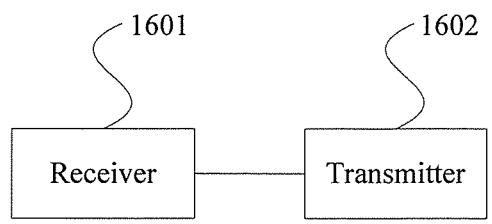
FIG. 16 is a schematic structural diagram of Embodiment 1 of another radio network controller according to the present invention.

FIG. 16 is a schematic structural diagram of Embodiment 1 of another radio network controller according to the present invention, and as shown in FIG. 16, the radio network controller includes: a receiver 1601 and a transmitter 1602.

The receiver 1601 is configured to receive a common control channel (CCCH) message or a dedicated control channel (DCCH) message that is sent on a PRACH by a user equipment (UE) that supports a fallback to PRACH function.

The transmitter 1602 is configured to send, to a base station, a frame or signaling that carries an indication that the UE currently is in a continuous reception state or a continuous scheduling state.

In a specific implementation process, the transmitter 1602 is specifically configured to insert indication information in a frame protocol (FP) frame, signaling, a response frame of the CCCH message or of the DCCH message, or the first downlink frame after the CCCH message or the DCCH message is received.

Workings of the receiver and the transmitter are the same as those in the method embodiment in FIG. 9, and no details are described herein again.

In addition, the base station provided by the present invention includes: a receiver.

The receiver is configured to receive the frame or the signaling that is sent by the radio network controller (RNC) and carries the indication that the user equipment (UE) currently is in the continuous reception state, where the frame or the signaling is used to enable the base station to continuously schedule downlink data.

Workings of the receiver are the same as those in the method embodiment in FIG. 10, and no details are described herein again.

In this embodiment, a UE is prevented from undergoing a DRX state, and an RNC indicates to a base station that the UE is in a continuous reception state, so that the base station immediately sends downlink data to the UE without needing to consider a delayed sending case.

It may be clearly understood by a person skilled in the art that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or apart of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for processing channel access performed by user equipment, comprising:
   receiving a fallback to physical random access channel (PRACH) configuration sent by a base station;
   configuring, in response to the received fallback to PRACH configuration, the user equipment to allow a discontinuous reception (DRX) state or a short-DRX state of enhanced DRX and prohibit a long-DRX state of the enhanced DRX by triggering the user equipment to fall back to the short-DRX state from the long-DRX state if the user equipment is in the long-DRX state;
   receiving a fallback to PRACH indication sent by the base station;
   initiating access on PRACH in response to the received fallback to PRACH indication;
   entering a continuous reception state in response to the received fallback to PRACH indication; and
   if a timer that triggers entering the DRX state is running when the fallback to PRACH indication is received, stopping the timer.

2. The method according to claim 1, wherein the entering the continuous reception state comprises:
   entering the continuous reception state when a positive acknowledgement frame that is fed back by the base station according to the preamble information is received on an acquisition indicator channel (AICH).

3. User equipment, comprising:
   a receiver configured to receive a fallback to physical random access channel (PRACH) configuration sent by a base station and a fallback to PRACH indication sent by the base station; and
   a processor configured to
     configure, in response to the received fallback to PRACH configuration, the user equipment to allow a discontinuous reception (DRX) state or a short-DRX state of enhanced DRX and prohibit a long-DRX state of the enhanced DRX by triggering the user equipment to fall back to the short-DRX state from the long-DRX state if the user equipment is in the long-DRX state,
     initiate access on PRACH in response to the received fallback to PRACH indication,
     cause the user equipment to enter a continuous reception state in response to the received fallback to PRACH indication, and
     if a timer that triggers the user equipment entering the DRX state is running when the fallback to PRACH indication is received, stop the timer.

4. The user equipment according to claim 3, wherein the processor is further configured to enable the user equipment to enter the continuous reception state when a positive acknowledgement frame that is fed back by the base station according to the preamble information is received on an acquisition indicator channel (AICH) by the receiver.

5. The method according to claim 1, wherein the entering the continuous reception state comprises:
   entering the continuous reception state when the fallback to PRACH indication is received.

6. The method according to claim 1, wherein the entering the continuous reception state comprises:
   entering the continuous reception state when preamble information is sent to the base station on the PRACH.

7. The method according to claim 1, wherein the entering the continuous reception state comprises:
   entering the continuous reception state after a common control channel (CCCH) message or a dedicated control channel (DCCH) message is sent to an RNC on the PRACH.

8. The method according to claim 1, further comprising:
   if a current state is the DRX state when the fallback to PRACH indication is received, exiting the DRX state and entering the continuous reception state.

9. The user equipment according to claim 3, wherein the processor is further configured to cause the user equipment to enter the continuous reception state when the fallback to PRACH indication is received.

10. The user equipment according to claim 3, wherein the processor is further configured to cause the user equipment to enter the continuous reception state when preamble information is sent to the base station on the PRACH.

11. The user equipment according to claim 3, wherein the processor is further configured to cause the user equipment to enter the continuous reception state after a common control channel (CCCH) message or a dedicated control channel (DCCH) message is sent to an RNC on the PRACH.

12. The user equipment according to claim 3, wherein the processor is further configured to, if a current state is the DRX state when the fallback to PRACH indication is received, cause the user equipment to exit the DRX state and enter the continuous reception state.

13. An apparatus, comprising a processor, wherein the processor is configured to:
- receive a fallback to physical random access channel (PRACH) configuration sent from a base station;
- configure, in response to the received fallback to PRACH configuration, the apparatus to allow a discontinuous reception (DRX) state or a short-DRX state of enhanced DRX and prohibit a long-DRX state of the enhanced DRX by triggering the user equipment to fall back to the short-DRX state from the long-DRX state if the user equipment is in the long-DRX state;
- receive a fallback to PRACH indication sent from the base station;
- initiate access on PRACH in response to the received fallback to PRACH indication;
- enter a continuous reception state in response to the received fallback to PRACH indication; and
- if a timer that triggers entering the DRX state is running when the fallback to PRACH indication is received, stop the timer.

14. The apparatus according to claim 13, wherein the processor is further configured to enter the continuous reception state when a positive acknowledgement frame that is fed back by the base station according to the preamble information is received on an acquisition indicator channel (AICH).

15. apparatus according to claim 13, wherein the processor is further configured to, if a current state is the DRX state when the fallback to PRACH indication is received, exit the DRX state and enter the continuous reception state.

\* \* \* \* \*

UNITED STATES PATENT AND TRADEMARK OFFICE
CERTIFICATE OF CORRECTION

PATENT NO. : 10,143,011 B2
APPLICATION NO. : 14/663024
DATED : November 27, 2018
INVENTOR(S) : Xiaoxiao Zheng et al.

Page 1 of 1

It is certified that error appears in the above-identified patent and that said Letters Patent is hereby corrected as shown below:

In the Specification

Column 1, Line 38, change "referred tows DRX off state." to --referred to as DRX off state.--.

Column 4, Line 59, change "and a sending module, configured to send, to abase" to --and a sending module, configured to send, to a base--.

Column 8, Line 13, change "indicator channel (RICH)." to --indicator channel (AICH).--.

Column 14, Line 38, change "RICH; or enter the continuous reception state after a CCCH" to --AICH; or enter the continuous reception state after a CCCH--.

Column 17, Line 34, change "apart of the steps of the methods" to --a part of the steps of the methods--;

Column 17, Line 62, change "to fall back to the short-DRX stat from the long-DRX" to --to fallback to the short-DRX state from the long-DRX--.

In the Claims

Column 20, Line 16, change "15. apparatus according to claim 13," to --15. The apparatus according to claim 13,--.

Signed and Sealed this
Twentieth Day of August, 2019

Andrei Iancu
*Director of the United States Patent and Trademark Office*